United States Patent
Wade

(10) Patent No.: US 7,374,176 B1
(45) Date of Patent: May 20, 2008

(54) LASER WELDED MULTI-LAYERED STEEL GASKET ASSEMBLY

(75) Inventor: Lloyd Garrold Wade, Somerville, AL (US)

(73) Assignee: Federal-Mogul World Wide, Inc., Southfield, MI (US)

(*) Notice: Subject to any disclaimer, the term of this patent is extended or adjusted under 35 U.S.C. 154(b) by 0 days.

(21) Appl. No.: 11/679,955

(22) Filed: Feb. 28, 2007

Related U.S. Application Data

(63) Continuation-in-part of application No. 10/756,591, filed on Jan. 13, 2004, now Pat. No. 7,200,932.

(51) Int. Cl.
*F02F 11/00* (2006.01)
*B21D 53/84* (2006.01)
*B23K 26/00* (2006.01)

(52) U.S. Cl. .................. 277/592; 29/888.3; 29/458
(58) Field of Classification Search ............ 277/592, 277/598; 29/888.3, 458
See application file for complete search history.

(56) References Cited

U.S. PATENT DOCUMENTS

| | | | |
|---|---|---|---|
| 4,103,913 A | 8/1978 | McDowell | |
| 4,873,415 A | 10/1989 | Johnson et al. | |
| 5,022,661 A | 6/1991 | Nakasone | |
| 5,277,434 A | 1/1994 | Kestly et al. | |
| 5,431,418 A | 7/1995 | Hagiwara et al. | |
| 5,490,681 A | 2/1996 | Plunkett et al. | |
| 5,560,623 A * | 10/1996 | Yoshino | 277/595 |
| 5,582,415 A | 12/1996 | Yoshida et al. | |
| 5,628,518 A | 5/1997 | Ushio et al. | |
| 5,938,208 A | 8/1999 | Yoshida et al. | |
| 5,979,906 A | 11/1999 | Silvian | |
| 6,053,503 A | 4/2000 | Buck et al. | |
| 6,076,833 A * | 6/2000 | Geshi | 277/595 |
| 6,139,024 A | 10/2000 | Yakushiji et al. | |
| 6,736,405 B2 * | 5/2004 | Hilgert | 277/593 |
| 6,926,285 B1 | 8/2005 | Suggs et al. | |
| 6,994,353 B2 * | 2/2006 | Kinoshita | 277/592 |
| 2001/0017446 A1 * | 8/2001 | Jinno | 277/594 |
| 2001/0052674 A1 | 12/2001 | Egloff | |
| 2002/0170521 A1 | 11/2002 | Hilgert | |
| 2002/0175478 A1 | 11/2002 | Hilgert | |
| 2005/0077687 A1 * | 4/2005 | Kinoshita | 277/592 |
| 2005/0093247 A1 * | 5/2005 | Udagawa | 277/593 |
| 2006/0197287 A1 * | 9/2006 | Farah et al. | 277/549 |

* cited by examiner

*Primary Examiner*—Patricia Engle
*Assistant Examiner*—Gilbert Y Lee
(74) *Attorney, Agent, or Firm*—Robert L. Stearns; Dickinson Wright PLLC

(57) ABSTRACT

The subject invention provides a method of manufacturing a multi-layered steel gasket assembly including a plurality of steel gasket layers each having a predetermined electrical resistance and including at least one coating layer of a material having an electrical resistance substantially greater than that of the steel gasket layers. The method includes the steps of: applying the coating layer of the selected material to at least one surface of at least one of the steel gasket layers to provide at least one coated gasket layer; assembling the coated gasket layer with at least one other steel gasket layer such that the coating layer prevents the use of traditional resistance welding in joining the gasket layers; and thereafter welding the assembled gasket layers together by either a JAG or CO2 laser to form the multi-layered steel gasket assembly.

4 Claims, 2 Drawing Sheets

LASER WELDED MULTI-LAYERED STEEL GASKET ASSEMBLY

RELATED APPLICATIONS

This application is a divisional of U.S. patent application Ser. No. 10/756,591, filed Jan. 13, 2004, and now U.S. Pat. No. 7,200,932, granted Apr. 10, 2007.

TECHNICAL FIELD

The subject invention relates generally to multi-layered steel gaskets for internal combustion engines, and more specifically to a method of manufacturing such a multi-layered steel gasket assembly.

BACKGROUND OF THE INVENTION

Multi-layered steel gaskets are traditionally used to form a seal between two mating components of a mechanical system or device, such as an internal combustion engine, to prevent leakage of combustion gases, cooling water, lubricating oil, or the like. Common applications involve placing a multi-layered steel gasket assembly between the engine block and cylinder head and between the engine block and exhaust manifold. Cylinder head gaskets typically extend around the cylinder bores of an engine to seal high-pressure combustion gases within the cylinder bores as well as seal oil and coolant passages. Exhaust manifold gaskets typically extend around the exhaust ports of an engine to seal high temperature exhaust gases flowing into the exhaust system. Once installed, the multi-layered steel gasket assembly bears the load from a bolted connection of the engine components and relies upon this load to provide an adequate seal therebetween.

Often, in the manufacture of multi-layered steel gaskets, at least one coating layer is disposed between a plurality of steel gasket layers to form a gasket assembly, such that the sealing ports defined by the gasket assembly are concentric. The coating layers are substantially coextensive with the plurality of steel gasket layers.

Often, the material selected for the coating layers has inherent an electrical insulating properties. Thus, the coating layers may have an electrical resistance substantially greater than that of the steel gasket layers, electrically insulating the plurality of steel gasket layers from each other. As such, the possibility of using resistance welding as the means of joining the plurality of steel gasket layers together is not feasible. In such cases, it is a common to secure the coated gasket layers together by means of rivets or eyelets. While effective, the use of rivets or eyelets add to the cost and complexity of manufacturing gaskets.

SUMMARY OF THE INVENTION

The subject invention provides a method of manufacturing a multi-layered steel gasket assembly comprising a plurality of steel gasket layers having a pre-determined electrical resistance and at least one coating layer having an electrical resistance substantially greater than that of the steel gasket layers. The coating layer of the material is applied to at least one surface of at least one of the plurality of steel gasket layers to provide at least one coated gasket layer. The coated gasket layer and at least one other steel gasket layer are assembled in a desired configuration. Thereafter, the coated gasket layer and the other steel gasket layer are welded together by a laser to form the multi-layered steel gasket assembly.

Thus, it can be appreciated that the subject invention provides an improved method of manufacturing a multi-layered steel gasket assembly by welding the coated gasket layer and at least one other steel gasket layer together by a laser. This method eliminates the separate operation of joining the coated gasket layer and the other steel gasket layer by rivets or eyelets, thereby improving the efficiency of the manufacturing process and reducing the cost of the multi-layered steel gasket assembly.

BRIEF DESCRIPTION OF THE SEVERAL VIEWS OF THE DRAWINGS

Advantages of the subject invention will be readily appreciated, as the same becomes better understood by reference to the following detailed description when considered in connection with the accompanying drawing wherein.

DETAILED DESCRIPTION OF THE INVENTION

Figure 1:
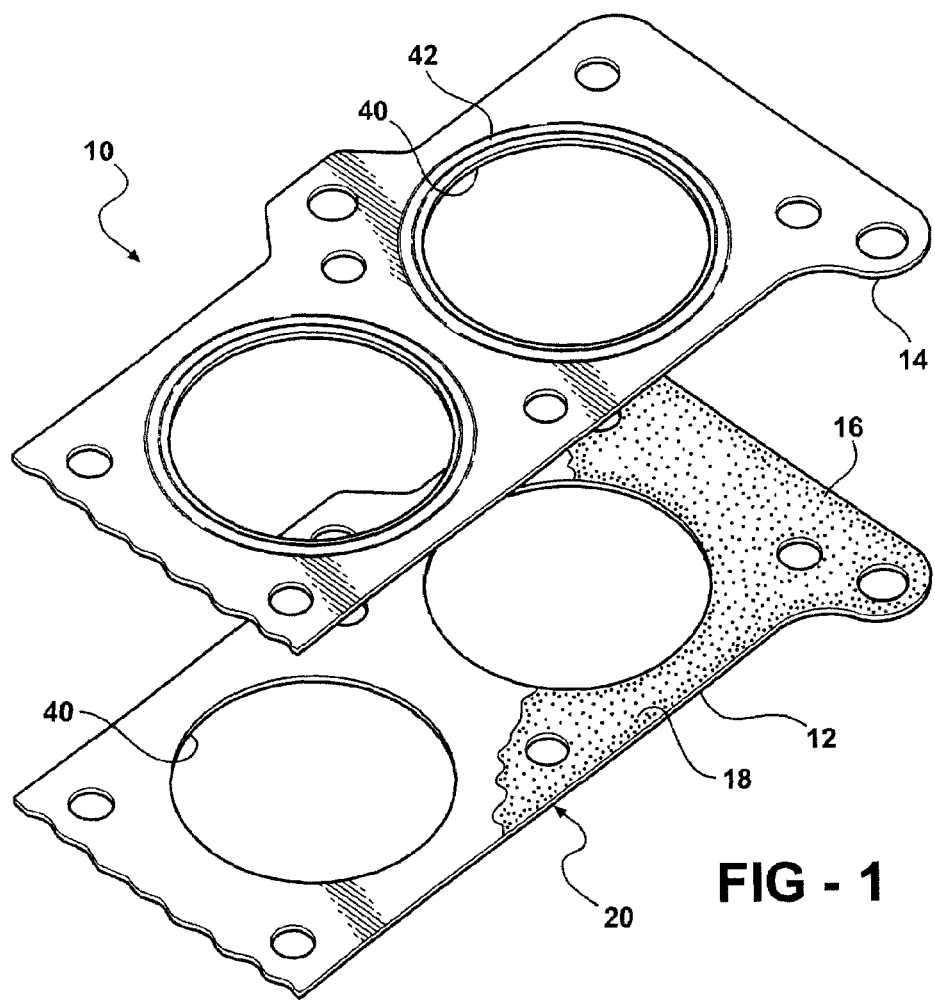
FIG. 1 is an exploded fragmentary perspective view of a multi-layered steel gasket assembly.

Referring to FIG. 1, the subject invention provides a method of manufacturing a multi-layered steel gasket assembly generally shown at 10 and including a plurality of steel gasket layers 12, 14, each having a predetermined electrical resistance, and including at least one coating layer 16 of a material having an electrical resistance substantially greater than that of the plurality of steel gasket layers 12, 14. The method of manufacturing the multi-layered gasket assembly 10 includes the steps of: applying the at least one coating layer 16 of the material to at least one surface 18 of at least one of the plurality of steel gasket layers 12, 14 to provide at least one coated gasket layer generally indicated at 20; assembling the at least one coated gasket layer 20 with at least one other steel gasket layer 14; and thereafter welding the assembled gasket layers together by one of a JAG or CO2 laser to form the gasket assembly 10.

As the material chosen for the at least one coating layer 16 has a significantly higher electrical resistance than that of the plurality of steel gasket layers 12, 14, it is not always possible to use traditional resistance welding to weld the assembled gasket layers; for example, when the at least one coating layer 16 is disposed between the plurality of steel gasket layers 12, 14. The subject invention provides for welding the plurality of steel gasket layers 12, 14 together with a laser, wherein a weld 46 extends through the at least one coating layer 16 disposed therebetween. The weld 46 is produced by a laser, and unlike traditional resistance welding, does not require an electrical ground to operate. The laser is therefore able to produce a weld 46 between the plurality of steel gasket layers 12, 14 with the at least one coating layer 16 of significantly higher electrical resistance disposed therebetween preventing an electrical ground between the plurality of steel gasket layers 12, 14.

The method of manufacturing the multi-layered steel gasket assembly 10 may further include a step of positioning the plurality of steel gasket layers 12, 14 and the at least one coating layer 16. The plurality of steel gasket layers 12, 14 and the at least one coating layer 16 are positioned in a desired configuration prior to assembly.

Figure 2:
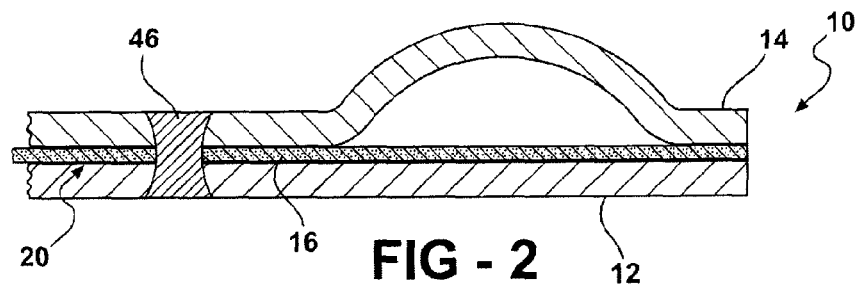
FIG. 2 is a fragmentary cross sectional view of a multi-layered steel gasket assembly.

Referring to FIG. 2, one possible configuration of the gasket assembly 10 includes positioning a first 12 and second 14 steel gasket layer and at least one coating layer 16 wherein the at least one coating layer 16 is disposed between a joining surface of the first 12 and second 14 steel gasket layers.

Figure 3:
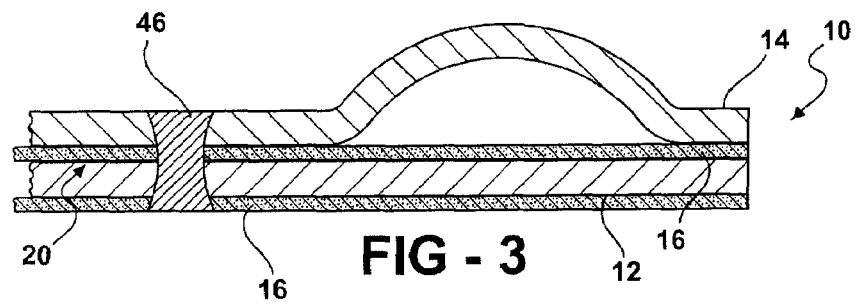
FIG. 3 is a fragmentary cross sectional view of another embodiment of the multi-layered steel gasket assembly.
Figure 4:
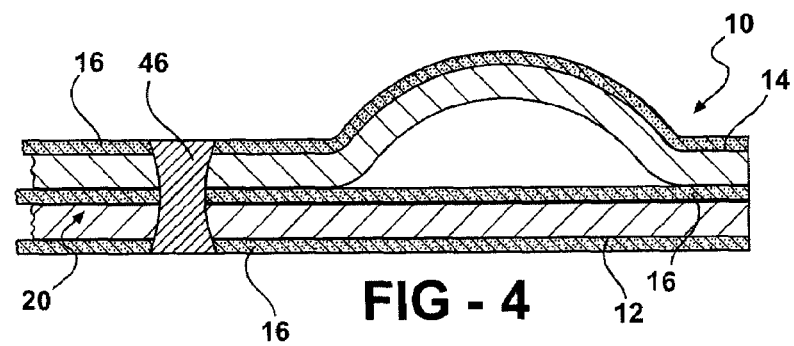
FIG. 4 is a fragmentary cross sectional view of another embodiment of the multi-layered steel gasket assembly.

Referring to FIGS. 3 and 4, a second possible configuration of the gasket assembly 10 includes positioning a first 12 and second 14 steel gasket layer and a plurality of coating layers 16 wherein at least one of the plurality of coating layers 16 is disposed between a joining surface of the first 12 and second 14 steel gasket layers and at least one of the plurality of coating layers 16 covers a non-joining surface of the first 12 and/or second 14 steel gasket layers.

Figure 5:
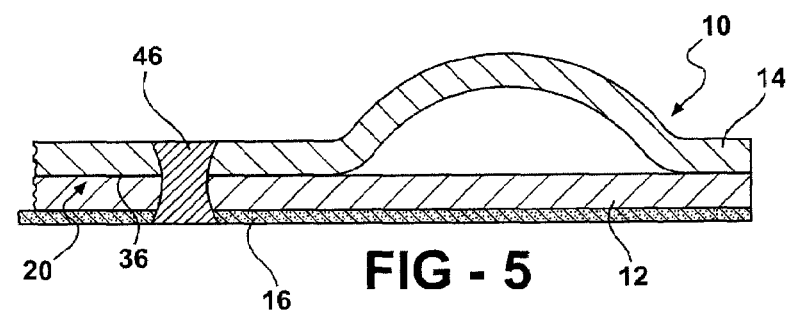
FIG. 5 is a fragmentary cross sectional view of another embodiment of the multi-layered steel gasket assembly.
Figure 6:
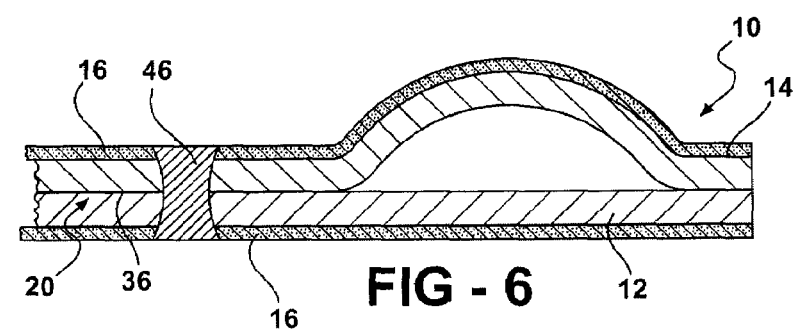
FIG. 6 is a fragmentary cross sectional view of another embodiment of the multi-layered steel gasket assembly.

Referring to FIGS. 5 and 6, a third possible configuration of the gasket assembly 10 includes positioning a first 12 and second 14 steel gasket layer and at least one coating layer 16 wherein a joining surface 36 of the first 12 and second 14 steel gasket layers are in direct contact with one another and the at least one coating layer 16 is in contact with a non-joining surface of the first 12 and/or second 14 steel gasket layers.

Referring to FIG. 1, the method of manufacturing the multi-layered steel gasket assembly 10 may further include a step of placing the plurality of steel gasket layers 12, 14 and the at least one coating layer 16 in a forming die.

A shaping step may also be included in the method of manufacturing the multi-layered steel gasket assembly 10. During the shaping step, the forming die shapes the plurality of steel gasket layers 12, 14 and the at least one coating layer 16. The preferred shape of the plurality of steel gasket layers 12, 14 and the at least one coating layer includes a plurality of aligned apertures 40 formed in the plurality of steel gasket layers 12, 14 and the at least one coating layer 16; and a plurality of resilient sealing beads 42 formed in at least one of the plurality of steel gasket layers 12, 14 and around at least one of the plurality of apertures 40 defined by the plurality of steel gasket layers 12, 14.

While it is contemplated that the step of welding the assembled gasket layers together may be performed at any time after assembling the gasket assembly 10, a preferred manufacturing process is to weld the assembled gasket layers together after the step of shaping the gasket assembly 10 and while the assembled gasket layers are in the forming die. It is possible that the step of welding the assembled gasket layers together while the assembled gasket layers are in the forming die may be performed before or after the shaping step.

A preferred material for the at least one coating layer 16 is molybdenum, although one skilled in the art will realize that there are several alternative materials that may be utilized for their specific material properties. The material chosen will be dependent upon the intended purpose of the gasket assembly and the required characteristics of the coating material.

Figure 7:
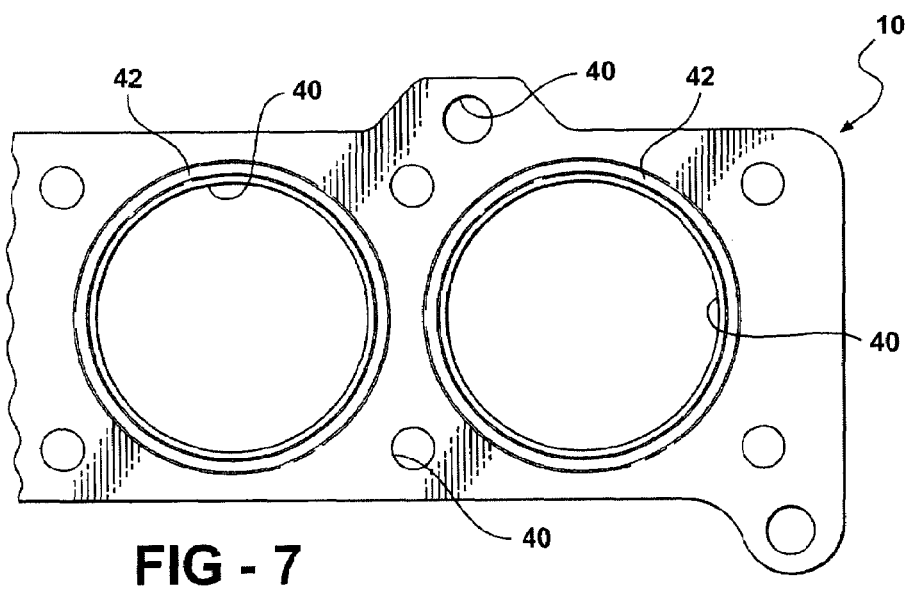
FIG. 7 is a fragmentary top view of the multi-layered steel gasket assembly.

As such, referring to FIGS. 2 and 7, a preferred embodiment of the gasket assembly 10 produced by the method of manufacturing includes the first 12 and second 14 steel gasket layers and the coating layer 16 of molybdenum disposed therebetween. The gasket assembly is joined together by the laser weld 46 connecting the first 12 and second 14 steel gasket layers and extending through the coating layer 16.

Obviously, many modifications and variations of the present invention are possible in light of the above teachings. It is, therefore, to be understood that within the scope of the appended claims, the invention may be practiced otherwise than is specifically described. The invention is defined by the claims.

What is claimed is:

1. A gasket assembly comprising:
   a plurality of steel gasket layers having at least one set of axially aligned apertures to be sealed and at least one sealing bead in at least one of said gasket layers;
   a coating of sealing material having an electrical resistance greater than that of said gasket layers applied to at least one surface of said gasket layers adjacent said at least one axially aligned apertures; and
   a weld directly joining said plurality of gasket layers and extending through said coating of sealing material.

2. The assembly of claim 1 wherein said sealing material is disposed on at least an inward surface of one of said gasket layers facing an adjacent one of said gasket layers.

3. The assembly of claim 1 wherein said plurality of gasket layers comprises two such gasket layers and said coating of sealing material is disposed at least between said gasket layers.

4. The assembly of claim 1 wherein said plurality of gasket layers comprises at least three such gasket layers and said coating of sealing material is disposed at least between two of said layers.

* * * * *